Figure 1:
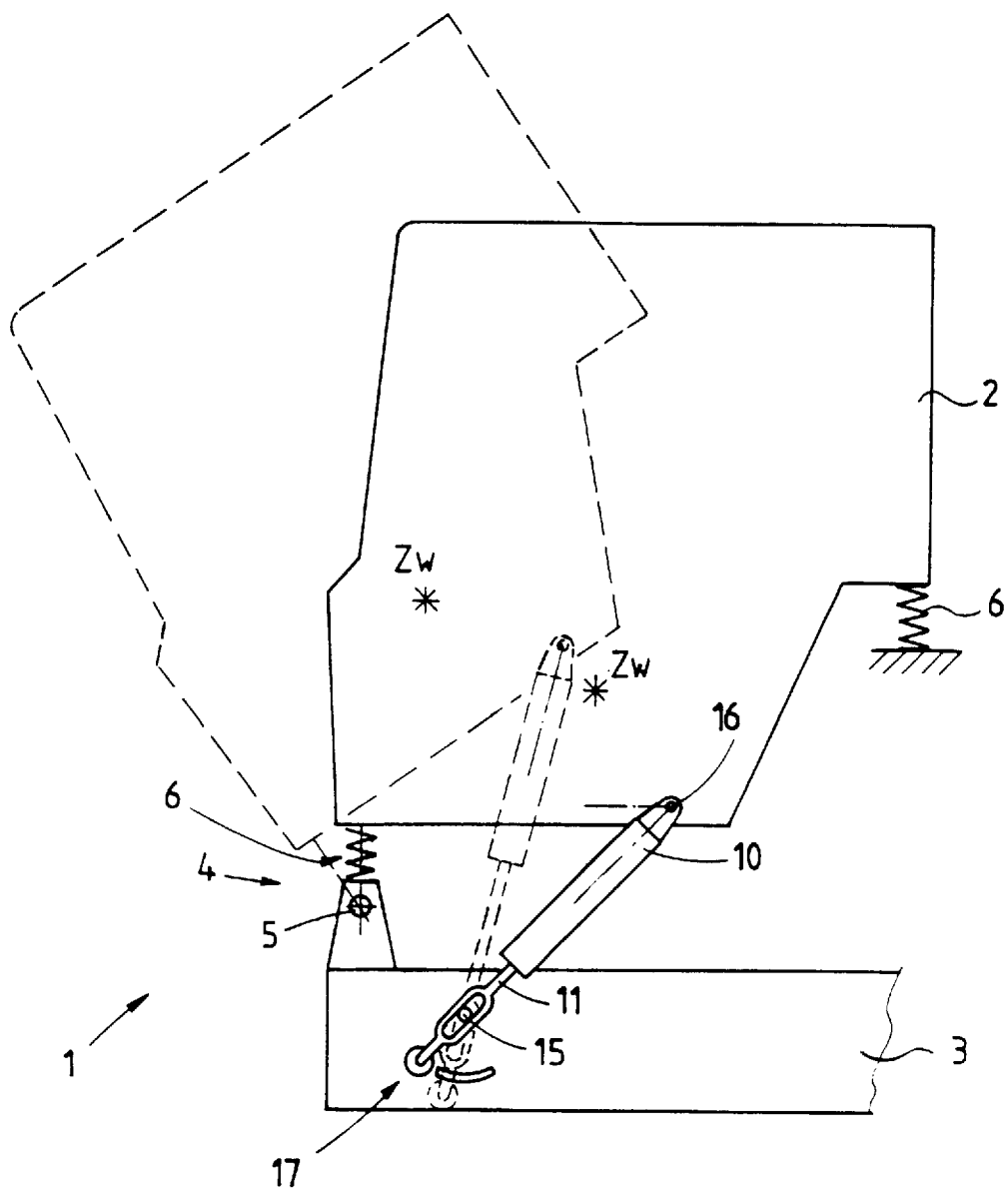

United States Patent

Sonneborn

[11] Patent Number: 5,839,278
[45] Date of Patent: Nov. 24, 1998

[54] ELECTROHYDRAULIC TILTING DEVICE FOR A VEHICLE WITH A TILTING CAB

[75] Inventor: Lambertus Johannes Sonneborn, Oldenzaal, Netherlands

[73] Assignee: Applied Power Inc., Butler, Wis.

[21] Appl. No.: 795,879

[22] Filed: Feb. 6, 1997

[30] Foreign Application Priority Data

Feb. 27, 1996 [NL] Netherlands ............ 1002460

[51] Int. Cl.⁶ .................................................. F16D 31/02
[52] U.S. Cl. ........................... 60/403; 60/431; 60/477; 296/107
[58] Field of Search ................. 60/431, 403, 477; 296/107, 117

[56] References Cited

U.S. PATENT DOCUMENTS

| | | | |
|---|---|---|---|
| 3,761,123 | 9/1973 | Neill et al. ............... | 296/28 C |
| 4,410,924 | 10/1983 | Hewitt et al. ............... | 361/25 |
| 4,746,097 | 5/1988 | Chung et al. ............... | 254/93 |
| 4,881,371 | 11/1989 | Haeder et al. ............... | 60/431 |
| 5,117,632 | 6/1992 | Strenzke ................... | 60/431 X |
| 5,528,444 | 6/1996 | Cooke et al. ............... | 361/20 |

FOREIGN PATENT DOCUMENTS

| | | |
|---|---|---|
| 57-155167 | 9/1982 | Japan . |
| 718637 | 11/1954 | United Kingdom . |

OTHER PUBLICATIONS

Applicant's Exhibit A, PCT Report Concerning Novelty Search of International Type NL Application No. 1002460, dated Oct. 2, 1996.

Primary Examiner—Hoang Nguyen
Attorney, Agent, or Firm—Quarles & Brady

[57] ABSTRACT

An electrohydraulic tilting device for a vehicle with a tilting cab has a pump, an electric pump drive motor connected by way of an electrical connecting line to a source for electrical energy, and a hydraulic piston/cylinder unit connected to the pump. The piston/cylinder unit is designed for exerting a force which is capable of tilting the cab forward and back. An overcurrent protection device is provided which is designed for automatic interruption and subsequently maintaining the interruption of the electrical power line of the pump motor when the electrical power taken up by the pump motor for a predetermined period exceeds a first threshold value which is higher than the maximum electrical power required during normal tilting of the cab. The overcurrent protection device is provided with manual reset means for ending the interruption of the power line.

5 Claims, 2 Drawing Sheets

ELECTROHYDRAULIC TILTING DEVICE FOR A VEHICLE WITH A TILTING CAB

The invention relates to an electrohydraulic tilting device for a vehicle with a tilting cab, comprising a pump for pumping hydraulic fluid, an electric pump drive motor for driving the pump, which pump motor is connected by an electrical power line to a source for electrical energy, and a hydraulic piston/cylinder unit connected to the pump, the piston/cylinder unit being designed for exerting a force which is capable of tilting the cab.

Such electrohydraulic tilting devices have been on the market for many years now, being marketed by, inter alia, the present applicant. Safety is a very important aspect of these devices.

The object of the present invention is to provide a tilting device with yet further increased safety and improved ease of use, which also contributes to greater safety.

This object is achieved by providing an electrohydraulic tilting device wherein an overcurrent protection device is provided, which automatically interrupts—and subsequently maintains the interruption of—the electrical power line of the pump drive motor when the electrical power taken up by the operating pump drive motor for a predetermined period exceeds a first threshold value which is higher than the maximum electrical power required during tilting of the cab, the overcurrent protection device being provided with manual reset means for ending the interruption of the power line.

The first threshold value at which the overcurrent protection device interrupts the power line can be, for example, 10% higher than the maximum electrical power taken up by the pump drive motor during the tilting of the cab.

Figure 2:
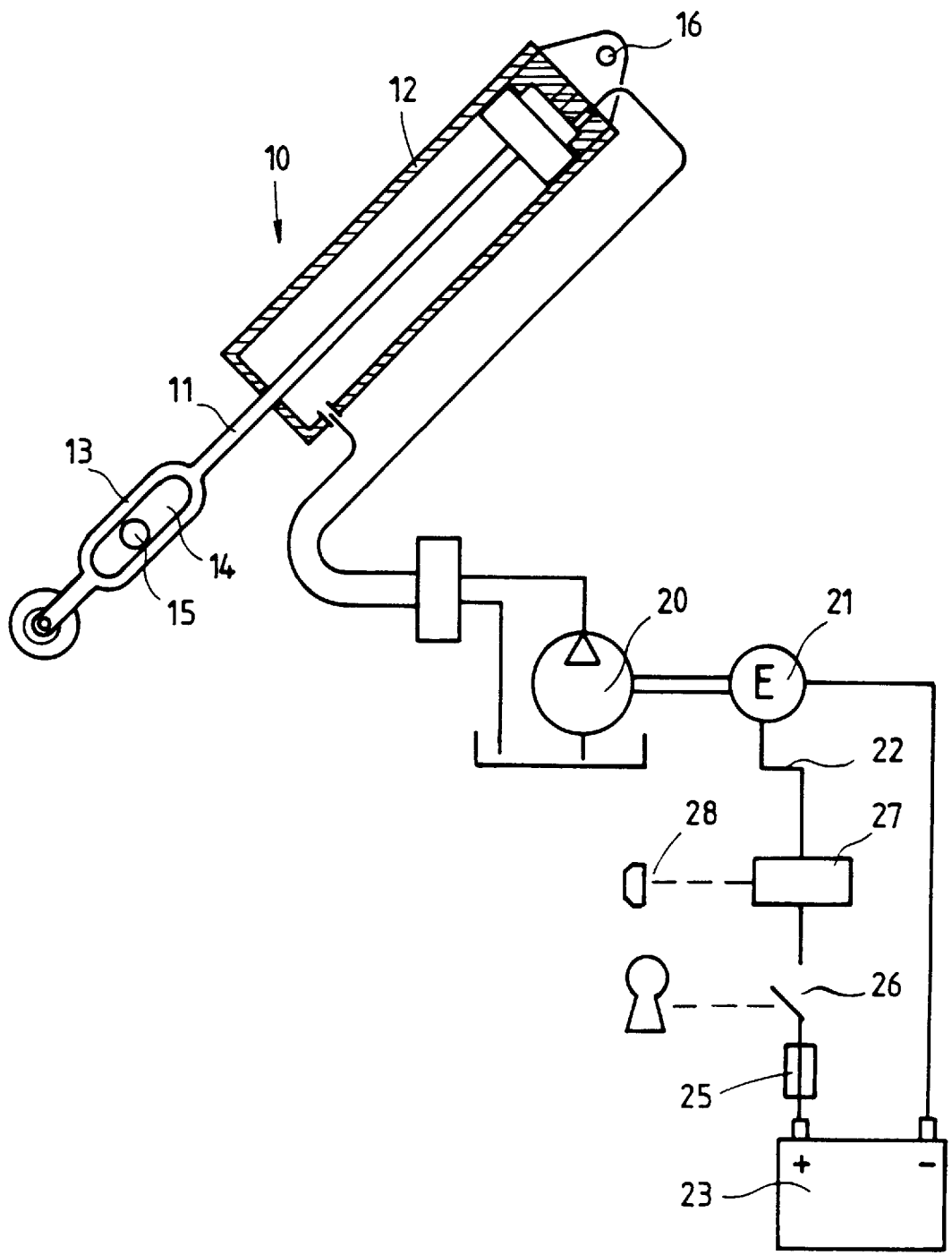

Further embodiments and advantages of the invention will be explained below with reference to the drawing, in which:

FIG. 1 shows diagrammatically in side view the front part of a vehicle with tilting cab, and FIG. 2 shows diagrammatically an exemplary embodiment of the tilting device according to the invention.

FIG. 1 shows the front part of a vehicle 1 with a tilting driver's cab 2. The cab 2 is mounted on chassis 3 and connected to the chassis 3 by hinge means 4. The hinge means 4 are designed such that the cab 2 can be tilted through an angle relative to the chassis 3 about a hinge pin 5 defined by the hinge means 4, between a driving position (solid lines) and a tilted forward position (dashed lines). In the tilted position of the cab 2 maintenance work can be carried out on the vehicle 1, in particular on the engine.

The cab 2 is resiliently supported relative to chassis 3 by way of suspension means 6 which are placed between the cab 2 and the chassis 3, in such a way that said cab can move up and down.

A hydraulic piston/cylinder unit 10, in practice one on each side of the cab 2, is provided for tilting the cab 2 forward and back again.

As can be seen clearly in FIG. 2, in which a piston/cylinder unit 10 is shown in the driving position of the cab 2, the piston/cylinder unit 10 comprises a piston rod 11 and a cylinder body 12. The end of the piston rod is provided with an eye 13 which forms a slotted hole 14. A pin 15, which is immovably fixed on the chassis 3, projects into the slotted hole 14. As a result of the pin/slot connection, the piston rod 11 can move freely within a certain range relative to the pin 15. The piston rod 11 can also carry out a swivelling movement about the pin 15.

The cylinder body 12 is hingedly fixed to a pin 16 which extends essentially parallel to the hinge pin 5 of the cab 2, and which is immovably fitted on the bottom side of the cab 2.

The pin/slot connection of the piston rod 11 of the piston/cylinder unit 10 to the chassis 3 in the driving position of the cab 2 makes movement of the piston/cylinder unit 10 relative to the chassis 3 possible, so that an unimpeded spring movement of the cab 2 relative to the chassis 3 is possible without a considerable force being exerted on the piston/cylinder unit 10.

Provision is also made for locking means 17 which during the forward tilting of the cab 2, before the centre of gravity (Zw) of the cab 2 passes the hinge pin 5, end the possibility of relative movement produced by the pin/slot connection, by connecting the piston/cylinder unit 10 essentially only hingedly to the chassis 3.

It can also be seen from FIG. 2 that the tilting device comprises a hydraulic pump 20, which is driven by an electric pump drive motor 21. The pump drive motor 21 is connected by an electrical power line 22 to a battery 23 of the vehicle.

A fuse 25 is accommodated in the power line 22, which fuse 25 rapidly interrupts the power line 22 if there is a short circuit resulting in a very high short-circuit current. The power line 22 also contains a key-operated switch 26, by means of which the pump 20 can be put into operation. Said key-operated switch 26 is preferably situated on the chassis 3 of the vehicle, and is designed such that the switch 26 has to remain manually operated while the cab 2 is tilting.

The power line 22 also contains an overcurrent protection device 27, which is designed for automatic interruption—and subsequently maintaining the interruption—of the power line 22 of the pump drive motor 21 when the electrical power taken up by the pump drive motor 21 for a predetermined period exceeds a first threshold value which is higher than the maximum electrical power required during normal tilting of the cab.

The ending of an interruption of the power line 22 produced by the overcurrent protection device 27 can be achieved only by a person deliberately operating a reset means 28, for example a push-button.

In order to achieve reliable operation of the tilting device, the first threshold value lies, for example, about 10% above the maximum electrical power taken up by the pump drive motor 21 during the normal tilting of the cab 2.

The fuse 25 interrupts the power line 22 when there is a short circuit, when the electrical power passed through the power line 22 exceeds a second threshold value which is higher than the first threshold value for the overcurrent protection device 27 to go into operation. The fuse 25 is preferably a rapid-reacting fuse.

If the piston/cylinder unit 10 for one reason or another is prevented from sliding out or in, with the result that the pump drive motor 21 is placed under a heavier load than if the sliding out or sliding in were actually possible, the pump drive motor 21 takes up electric power in excess of the first threshold value. After the predetermined time period has lapsed the pump drive motor 21 is then switched off automatically. A practical example for this situation is that a latch by means of which the cab 2 is secured against tilting forward during driving does not open to allow the tilting of the cab. Another example is that the cab of the vehicle in a workshop runs against an obstacle during tilting. As a safety measure in such situations, the known hydraulic tilting devices are generally provided with a hydraulic safety valve, which is accommodated in the fluid line between the pump and the piston/cylinder unit. The measure according to the invention means that in principle this safety valve can be omitted.

A further advantage of the invention is that tilting of the cab is possible only if the interruption of the electrical power line 22 of the pump drive motor 21 produced by the overcurrent protection device during the previous tilting (both forward and back to the driving position) of the cab 2 is deliberately ended by a person, by operating the button 28. In order to make unauthorized tilting of the cab difficult, for example for stealing parts of the engine of a parked vehicle, the reset means 28 for ending the interruption of the electrical power line 22 produced by the overcurrent protection device 27 is preferably fitted at a point on the chassis 3 of the vehicle where it is not visible.

The invention is also particularly advantageous in the case of tilting devices which are intended for vehicles with a resiliently supported cab which can move up and down relative to the chassis, as shown in FIG. 1. In this case the piston/cylinder unit has a possibility of movement relative to the chassis or the cab in the driving position of the cab, so that an unimpeded spring movement of the cab relative to the chassis is possible without a considerable force being exerted on the piston/cylinder unit. In order to provide this possibility of relative movement, it is then generally necessary for the piston/cylinder unit to slide in to the maximum extent up to a stop (see FIG. 2).

The measure according to the invention also means that it is possible to switch on the pump drive motor 21 and then leave it in operation until the piston/cylinder unit 10 has slid in or slid out to the maximum extent. After some time, the pump drive motor 21 will then be stopped automatically by the overcurrent protection device 27.

I claim:

1. In a vehicle having a chassis and a tiltable cab, an electrohydraulic tilting device including a pump for pumping hydraulic fluid, an electric pump drive motor for driving the pump, which pump drive motor is connected by an electrical power line to a source for electrical energy, and a hydraulic piston/cylinder unit connected to the pump, the piston/cylinder unit being designed for exerting a force which is capable of tilting the cab, the improvement wherein an overcurrent protection device is provided which automatically interrupts and subsequently maintains the interruption of the electrical power line of the pump drive motor when the electrical power taken up by the pump drive motor for a predetermined period exceeds a first threshold value which is higher than the maximum electrical power required during normal tilting of the cab, the overcurrent protection device being provided with manual reset means for ending the interruption of the power line.

2. The improvement of claim 1, wherein a short-circuit protection device is provided, which short-circuit protection device interrupts and subsequently maintains the interruption of the power line when the electrical power passed through the power line exceeds a second threshold value which is higher than the first threshold value.

3. The improvement of claim 1, wherein a key-operated switch is contained in the power line, which switch has to remain manually operated to tilt the cab.

4. The improvement of claim 1, wherein said manual reset means is positioned on said vehicle so as not to be normally visible.

5. The improvement of claim 1, wherein said overcurrent protection device turns off said motor when said piston/cylinder unit has reached the limit of its extension or retraction.

* * * * *